United States Patent [19]

Weitemeyer

[11] Patent Number: 4,533,723

[45] Date of Patent: Aug. 6, 1985

[54] SEMI-ESTERS OF POLYISOBUTYLENESUCCINIC ACID, THEIR SYNTHESIS AND PREPARATIONS CONTAINING THESE COMPOUNDS WHICH CAN BE TRANSFORMED BY RADIATION INTO AN ADHESIVE

[75] Inventor: Christian Weitemeyer, Essen, Fed. Rep. of Germany

[73] Assignee: TH. Goldschmidt AG, Essen, Fed. Rep. of Germany

[21] Appl. No.: 625,712

[22] Filed: Jun. 28, 1984

[30] Foreign Application Priority Data

Jul. 2, 1983 [DE] Fed. Rep. of Germany ....... 3323913

[51] Int. Cl.³ .............................................. C08G 63/52
[52] U.S. Cl. ................................ 528/303; 204/159.16; 204/159.19; 204/159.22; 528/306; 560/193; 560/198
[58] Field of Search ............................... 528/303, 306; 204/159.16, 159.19, 159.22; 560/193, 198

[56] References Cited

U.S. PATENT DOCUMENTS 4,124,571 11/1978 Georgoudis ..................... 528/304 X
4,276,388 6/1981 Iwami et al. ..................... 528/303 X
4,375,540 3/1983 Joyner et al. ..................... 528/307 X

*Primary Examiner*—Lucille M. Phynes
*Attorney, Agent, or Firm*—Toren, McGeady, Stanger, Goldberg & Kiel

[57] ABSTRACT

Semi-esters of polyisobutylenesuccinic acid having the formula

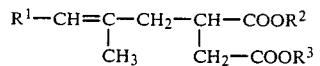

in which
R¹ is a polyisobutylene radical with a molecular weight of 100 to 20,000,
R² and
R³ are different from one another and one of these two radicals is a hydrogen radical and the other one of the groups

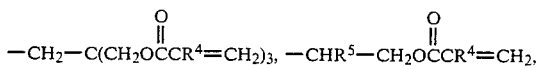

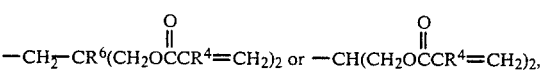

in which
R⁴, R⁵ is a hydrogen or methyl radical, and
R⁶ is a methyl or ethyl radical.

The invention furthermore relates to processes for synthesizing these compounds as well as to preparations which can be converted by radiation into adhesives.

4 Claims, No Drawings

SEMI-ESTERS OF POLYISOBUTYLENESUCCINIC ACID, THEIR SYNTHESIS AND PREPARATIONS CONTAINING THESE COMPOUNDS WHICH CAN BE TRANSFORMED BY RADIATION INTO AN ADHESIVE

BACKGROUND OF THE INVENTION

1. Field of the Invention

The invention relates to new semi-esters of polyisobutylenesuccinic acid and acrylic or methacrylic esters having alcohol groups as well as to processes for the synthesis of these compounds by a known esterification reaction. The invention furthermore relates to preparations which can be converted by radiation into an adhesive.

2. Description of the Prior Art

The synthesis of polyisobutylenesuccinic anhydride by reacting polyisobutylene with maleic anhydride is well known. These acid anhydrides are used as starting compounds for the synthesis of unsaturated polyesters by cocondensation with glycols and maleic anhydride, of alkyd resins and of flexible polyols for the synthesis of polyurethanes.

SUMMARY OF THE INVENTION

I have discovered compounds which possess adhesive properties, especially pressure-sensitive adhesive properties, which can be induced by irradiation. The suitability of such compounds for use as adhesives presupposes that the polymerization induced by the radiation does not lead to an embrittlement of the products but that instead, these still have adequate flexibility and tack.

I surprisingly discovered that certain semi-esters of polyisobutylenesuccinic acid permit the synthesis of preparations which can be converted by radiation into adhesives, especially those with the properties of a pressure-sensitive adhesive, and which are distinguished by high adhesive strength, excellent properties as pressure-sensitive adhesives and the ability to be cured under mild conditions.

More particularly, the compounds of the present invention have the formula

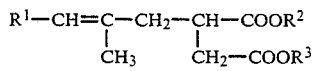   I in which
R$^1$ is a polyisobutylene radical with a molecular weight of 100 to 20,000,
R$^2$ and R$^3$ are different from one another and one of these two radicals is a hydrogen radical and the other is one of the groups:

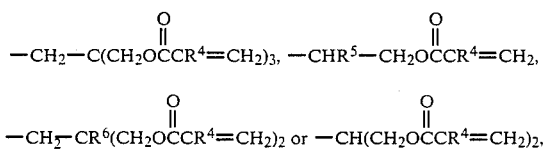

in which
R$^4$, R$^5$ is a hydrogen or methyl radical, and
R$^6$ is a methyl or ethyl radical.

The new semi-esters of polyisobutylenesuccinic acid still have a free carboxyl group. The properties of the inventive compounds can be influenced even further by reacting this carboxyl group with compounds which have suitable functional groups.

The inventive compounds are moderately to highly viscous liquids, depending on their molecular weight. They are polymerized into adhesive compositions by the action of high energy radiation, especially by electron beams or UV light.

Additionally, the inventive compounds can be synthesized using conventional procedures by reacting polyisobutylenesuccinic anhydride with equimolar amounts of the alcohol R$^2$OH or R$^3$OH under conventional esterification conditions and, preferably, in the presence of a solvent.

DESCRIPTION OF THE PREFERRED EMBODIMENTS

As used herein, conventional esterification conditions are understood to be those under which esterifications are generally carried out and which are known to those skilled in the art. These include the use of an elevated temperature, preferably a temperature of 40° to 100° C. The esterification reaction can advantageously be carried out using a solvent. The esterification reaction can be carried out in the presence of known catalysts, such as, for example, catalytic amounts of tertiary amines. Slight amounts, e.g., 0.02 to 1 weight percent, of polymerization inhibitors, such as, hydroquinone, may be added in order to avoid unwanted polymerization of the acrylate or methacrylate groups.

The present invention further provides preparations which form adhesives through irradiation and consist of 30 to 100 weight percent of compound (I), 0 to 70 weight percent of radiation-polymerizable monomers and/or oligomers, 0 to 15 weight percent of initiators, and 0 to 50 weight percent of conventional additives, such as, gluing auxiliaries, pigments and fillers.

The inventive preparations contain at least 30 weight percent of compound (I). They may also contain up to 70 weight percent of radiation-polymerizable monomers and/or oligomers. Examples of such monomers or oligomers are hexanediol diacrylate, 2-ethylhexyl acrylate, trimethylolpropane triacrylate or so-called epoxy acrylates which are derived from bisphenol A, urethane acrylates and polyester acrylates. By the addition of these monomers and/or oligomers it is possible to influence properties of the adhesives and especially the viscosity, the curing rate and/or the adhesive properties.

The inventive preparations may contain up to 15 weight percent of initiators. The addition of initiators can be dispensed with for the electron-beam polymerization of the inventive compound (I), contained in the preparations. Initiators are, however, required when curing with UV radiation. Suitable initiators are aromatic ketones, hydroxyketones, benzoin ethers and other compounds, which are known for this purpose and which, optionally, may contain activating additives, such as amines.

The inventive preparations may contain up to 50 weight percent of conventional additives. Conventional additives are, for example, materials which are admixed in order to influence gluing properties and are described as gluing auxiliaries. For example, it is possible to admix polyisobutylene which has no functional groups. It is furthermore possible to add pigments and/or fillers, provided they do not impair the adhesive properties.

The use of solvents is possible, but is generally avoided, since it is a particular advantage of the inventive compounds that, because of their consistency, they can be processed in the solvent-free state.

Typical examples of inventive gluing auxiliaries are products which provide tack, such as, for example, polybutylene, polybutadiene, polyisoprene, polychloroprene, polyacrylates, polyvinyl acetates of different molecular weight, natural rubber, natural resin esters, and so-called hydrocarbon resins. Further suitable products are known to those skilled in the art from German Offenlegungsschrift 23 40 040.

Suitable fillers are calcium carbonate, silica, carbon black, talc and silicates.

The following examples illustrate the invention.

EXAMPLE 1

A polyisobutylenesuccinic anhydride (52.8 g, 0.05 moles) with a molecular weight of 1056, and 14.9 g of pentaerythritol triacrylate were stirred as a 50% solution in toluene for 60 hours at room temperature. After removal of the solvent, a brown liquid with a viscosity of 45,000 mPa.sec was obtained.

Acid value: $0.70 \times 10^{-3}$ mg KOH/g of substance (theoretical: $0.71 \times 10^{-3}$).

Typical IR bands:

| | |
|---|---|
| 1366 cm$^{-1}$ m | } polyisobutylene portion of the molecule |
| 1390 cm$^{-1}$ m | |
| 810 cm$^{-1}$ m | } acrylate portion of the molecule |
| 1410 cm$^{-1}$ s | |
| 1735 cm$^{-1}$ s | | m = medium
s = strong

EXAMPLE 2

The polyisobutylenesuccinic anhydride (52.8 g) from Example 1 was stirred with 5.8 g of 2-hydroxyethyl acrylate as a 50% solution in toluene for 3 hours at 60° C. The solvent was then removed under vacuum and a brown liquid with a viscosity of 23,000 mPa.sec was obtained.

Acid value: $0.80 \times 10^{-3}$ mg KOH/g of substance (theoretical: $0.82 \times 10^{-3}$).

Typical IR bands:

| | |
|---|---|
| 1366 cm$^{-1}$ m | } polyisobutylene portion of the molecule |
| 1390 cm$^{-1}$ m | |
| 810 cm$^{-1}$ w | } acrylate portion of the molecule |
| 1410 cm$^{-1}$ w | |
| 1735 cm$^{-1}$ s | | m = medium
s = strong
w = weak

EXAMPLE 3

A polyisobutylenesuccinic anhydride (146 g, 0.05 moles) with a molecular weight of 2920, and 6.5 g of 2-hydroxypropyl acrylate were stirred as a 50% solution in toluene for 5 hours at 85° C. After removal of the solvent, a brown liquid with a viscosity of 39,000 mPa.sec was obtained.

Acid value: $0.31 \times 10^{-3}$ mg KOH/g of substance (theoretical: $0.33 \times 10^{-3}$)

Typical IR bands, like those in Example 2, were observed.

Curing and Testing Suitability

The products of Examples 1 to 3 as well as the preparations from these products which are listed in the following table were mixed with 8% diethoxyacetophenone and cured as a 20 μm thick layer on 90 g/m² paper in 1 to 3 seconds by illumination with a medium pressure mercury vapor UV lamp (80 W/cm).

| Preparation | 1 | 2 | 3 | 4 | 5 | 6 | 7 | 8 | 9 |
|---|---|---|---|---|---|---|---|---|---|
| Product/Example 1 | 100 | | | 90 | 40 | 20 | | 60 | 40 |
| Product/Example 2 | | 100 | | | 40 | | | | 40 |
| Product/Example 3 | | | 100 | | | 20 | 60 | | 10 |
| Polyisobutylene MW of 3,000 | | | | 10 | | 20 | 5 | 15 | |
| Hexanediol acrylate | | | | | 20 | | 20 | | |
| Oligomeric polyester acrylate MW of 500 | | | | | | 40 | 15 | | |
| Oligomeric epoxy acrylate of MG 700 | | | | | | | | 25 | |
| Polybutadiene MG of 6,000 | | | | | | | | | 10 |

Strips of the coated and UV-irradiated papers, 3 cm wide, were applied on polybutylene terephthalate as well as on chromic acid pretreated aluminum by rolling a 9 kg roller back and forth five times. In attempts to detach the paper strips, which had been coated with Preparations 1 to 9 cured into adhesive products, the paper was destroyed in all cases.

Without curing, on the other hand, Preparations 1 to 9 penetrate into the coated papers. These papers can then be easily detached from polyester and aluminum without being destroyed.

This shows that the inventively synthesized products and preparations can be converted from the liquid state into solid form by radiation induced polymerization. In this form, they are suitable for use as pressure-sensitive adhesives.

I claim:

1. Semi-esters of polyisobutylenesuccinic acid having the formula

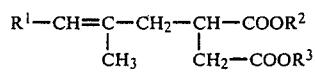

in which
R$^1$ is a polyisobutylene radical with a molecular weight of 100 to 20,000,
R$^2$ and
R$^3$ are different from one another and one of these two radicals is a hydrogen radical and the other one a group, selected from the group consisting of

in which
R$^4$ and R$^5$ are a hydrogen or methyl radical, and
R$^6$ is a methyl or ethyl radical.

2. A process for the synthesis of compound (I) wherein polyisobutylenesuccinic anhydride is reacted with equimolar amounts of the alcohol $R^2OH$ or $R^3OH$ under conventional esterification conditions.

3. The process of claim 2 wherein a solvent is present.

4. A composition comprising
   30 to 100 weight percent of compound (I),
   0 to 70 weight percent radiation-polymerizable monomers or oligomers,
   0 to 15 weight percent initiators, and
   0 to 50 weight percent of conventional additives,
said composition being convertible to an adhesive by irradiation.

* * * * *